United States Patent
Decker, Jr.

[15] 3,700,332
[45] Oct. 24, 1972

[54] SPECTRAL ANALYSIS USING A MODULATING MASK TRANSMITTING SELECTED SPECTRAL LINES AND REFERENCE BANDS

[72] Inventor: John A. Decker, Jr., Concord, Mass.
[73] Assignee: Comstock & Westcott, Inc.
[22] Filed: March 5, 1971
[21] Appl. No.: 121,283

[52] U.S. Cl.................356/97, 250/237 G, 356/74, 356/82
[51] Int. Cl............G01j 3/42, G01j 3/36, G01j 3/00
[58] Field of Search..........356/74, 79, 82, 87, 86, 97, 356/99, 100; 250/237 G

[56] References Cited

UNITED STATES PATENTS

| | | |
|---|---|---|
| 3,518,002 | 6/1970 | Barringer et al..............356/97 |
| 3,578,980 | 5/1971 | Decker, Jr. et al. ...250/237 G |
| 3,052,154 | 9/1962 | Bolz.............................356/99 |
| 3,565,567 | 2/1971 | Rains..........................356/87 |

OTHER PUBLICATIONS

" A Method of Background Correction . . . ."; Leys; Analytical Chemistry; Vol. 41; No. 2, pg. 396– 398; February 1969

*Primary Examiner*—Ronald L. Wibert
*Assistant Examiner*—V. P. McGraw
*Attorney*—James H. Grover

[57] ABSTRACT

For detecting specific gases in an automobile exhaust selected lines of the exhaust gas absorption spectrum and reference bands of the spectrum close to the lines are chopped by a mask at the spectral plane so that the light flux from the lines and bands are transmitted at different times. The flux of the lines and bands are also encoded by the chopping mask or a successive encoding mask and applied to a single photodetector which produces a series of electrical values representing the flux of the selected spectral lines.

25 Claims, 7 Drawing Figures

INVENTOR
JOHN A. DECKER, JR.

BY *James H. Tarver*
ATT'Y

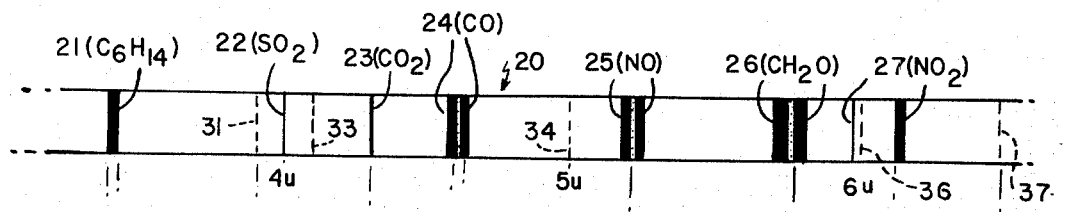
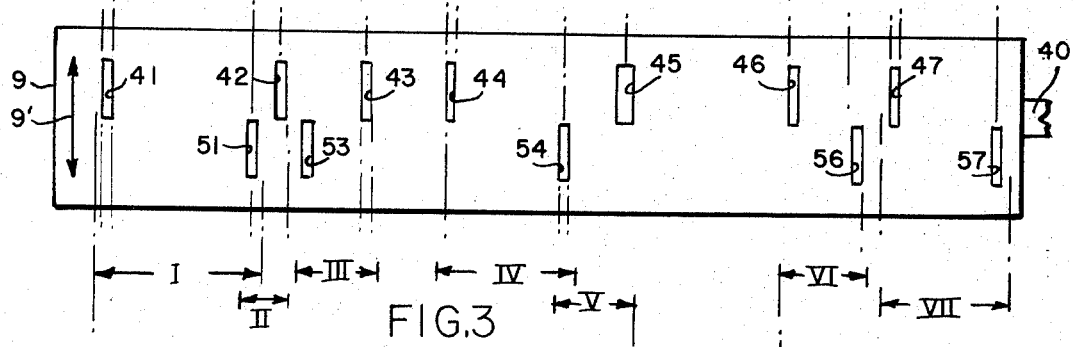
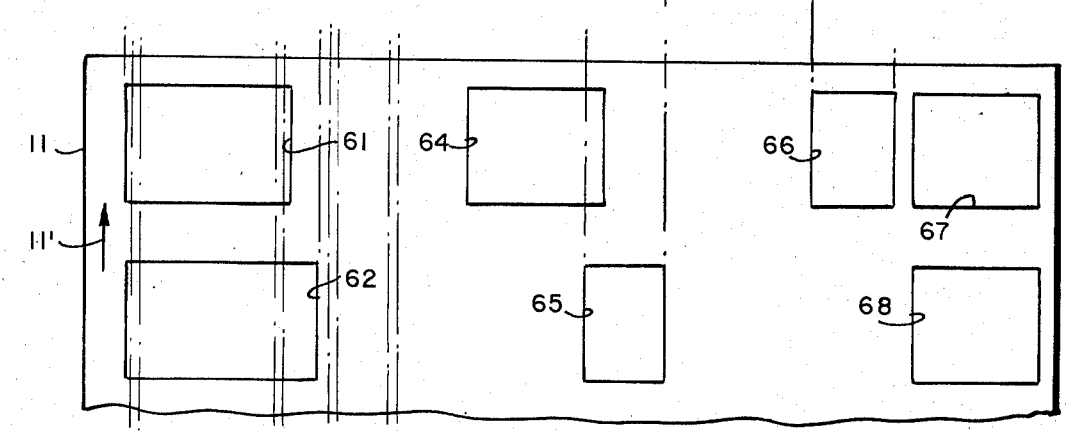
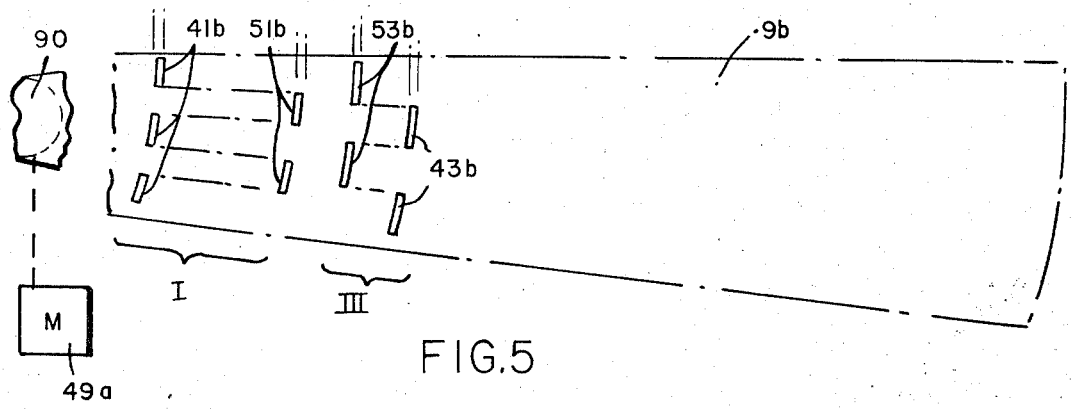

3,700,332

SPECTRAL ANALYSIS USING A MODULATING MASK TRANSMITTING SELECTED SPECTRAL LINES AND REFERENCE BANDS

BACKGROUND OF THE INVENTION

In the control or study of various chemical and industrial processes it is necessary to analyze the composition of a fluid stream and detect certain of desirable or undesirable constituents present. For example, there is a current need for apparatus to detect the several specific harmful gases present in an automobile exhaust. While such gases must be detected accurately, they must also be detected quickly, and the analyzing apparatus must be reliable and economically priced for wide use.

A conventional scanning spectrometer or like spectral dispersion instrument which sweeps all the wavelengths of a spectrum is extremely slow and senses the wavelengths of interest for relatively short periods. A conventional polychromator such as a spectrometer with a plurality of exit slots can simultaneously sense all wavelengths of interest, but requires an equal number of photodetectors and amplifier channels leading to a very expensive apparatus. Both the above-mentioned techniques are subject to inaccuracy from drift from time to time within the spectrometer and in the amplifier channels.

The object of the present invention is to provide an improved and economical apparatus and method which rapidly and accurately detects the light flux of selected lines of a spectrum.

SUMMARY OF THE INVENTION

According to the invention optical apparatus for measuring the energy of a selected line in a spectrum having at least one band of predetermined spectroscopic characteristic proximate to the selected line comprises modulator means for repeatedly transmitting and obscuring the light flux from said selected line and proximate band concomitantly and photoelectric means for sensing the chopped flux, and means for projecting the chopped flux from said line and band on said photoelectric means thereby to cause said means to produce electrical values representing the flux of the selected line.

Further according to the invention a method of measuring the light flux of selected lines of a dispersed spectrum comprises masking the spectrum except for the selected lines and at least one wavelength band proximate to said lines, periodically masking and transmitting flux from said lines and band, the flux from said lines being transmitted at different times than the flux from said band, optically encoding the periodically transmitted flux from the lines and band, and photoelectrically detecting the periodically transmitted and encoded flux, to produce an electrical signal representative of the flux of the selected lines.

DRAWINGS

For the purpose of illustration typical embodiments of the present invention are shown in the accompanying drawings, in which:

FIG. 2 is a spectral image containing characteristic lines and proximate bands;

FIG. 3 is a plan view of the chopping mask of FIG. 1;

FIG. 4 is a plan view of the encoding mask of FIG. 1, partly broken away;

FIG. 5 is a plan view of a chopping and encoding disk alternatively used in the apparatus of FIG. 1;

DESCRIPTION

Figure 1:
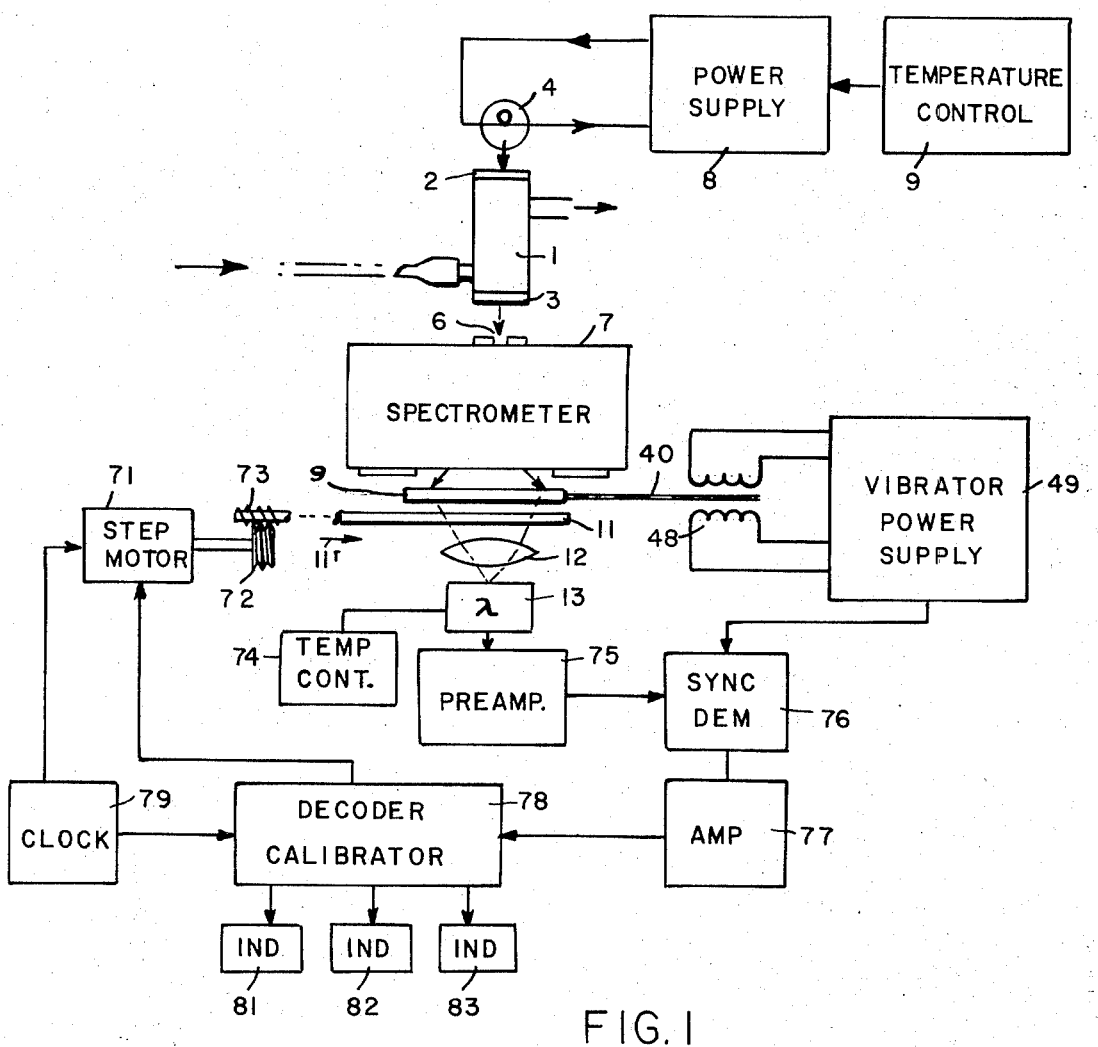
FIG. 1 is a diagram of optical apparatus for analyzing an automobile exhaust spectrum with chopping and encoding masks.

The apparatus shown in FIG. 1 is designed for analysis of automobile exhaust and detection of its significant component gases. It may, however, be used to detect the components of any fluid or stream of a process. The gas is fed from an automobile exhaust through a sample cell 1 having window 2 and 3 allowing a light beam from a source 4 to pass through the gases in the cell to the entrance slit 6 of a spectrometer 7, being absorbed selectively by the components of the gas. For automobile exhaust the light source is infrared radiation generally covering the 3 to 7 micron wavelengths absorbed by gases of such an exhaust. For other fluid streams appropriate sources of electromagnetic energy would be used. The infrared source shown is powered by a supply 8 under the regulation of a temperature control 9 which limits the temperature drift of the light source 4 to $\pm 10°K$, typically.

The spectrometer 7 disperses the entering light beam conventionally by means of a prism or grating in a spectrum spread along a chopping mask 9 lying in the image plan of the spectrometer. After modulation passing through the chopping mask 9 and an encoding mask 11, described hereafter, the spectrum is collected by suitable focusing optics 12 on a photoelectric detector 13.

A typical automobile exhaust infrared absorption spectrum 20 appearing at the plane of the modulating or chopping mask 9 is shown in FIG. 2. The spectrum comprises the dark, absorption lines of hexane 21 ($C_6H_{14}$) at 3.5 microns as typical of the hydrocarbons, of sulphur dioxide 22 ($SO_2$) at 4.0 microns, of carbon dioxide 23 ($CO_2$) at 4.3 microns, of carbon monoxide 24 (CO) at 4.6 microns, of nitric oxide 25 (NO) with an absorption peak at 5.2 microns, of formaldehyde 26 ($CH_2O$) peaking at 5.8 microns as typical of the aldehydes, and of the unstable gas nitrogen dioxide 27 ($NO_2$) peaking below 6 microns with a major absorption peak 26 at 6.15 microns. Also appearing in FIG. 2 are dashed lines 31, 33, 34, 36 and 37 which, to differentiate from the absorption lines, are called bands herein. The dashed bands are wavelengths selected from the spectrum as representative of reference flux levels appearing in the exhaust absorption spectrum at wavelengths which are negligibly absorbed by the gas or gasses of interest, but which suffer all the absorption at the windows 2 and 3 of the sample cell 1 and elsewhere, which absorption would be suffered by the flux from the gas absorption lines of interest. More particularly the reference bands are selected because of their absorption by water vapor and other exhaust gases not of interest and whose presence and extent of absorption over the spectral range involved is not predictable, and hence might interfere with accurate measurement of the preselected spectral lines of interest. Thus, despite the unpredictable amount of absorption, the bands provide reference levels of flux from which the flux of the spectral lines differ in proportion to the absorption by the preselected gases of interest. The bands are proximate to and serve as reference flux levels for one or more of the lines 21 to 27.

As previously mentioned, the entire spectrum 20 of FIG. 2 is focused on a chopping mask 9 which functions both as a multiple exit slot mask and as a modulator in a novel manner now to be described. The chopping mask 9 is carried on a reed 40 vibrated by coils 48 connected to a power supply 49. Formed in the mask are two sets of elongate slits, windows or like light transmitting portions. The first set, comprising slits 41 to 47, corresponds to the absorption lines 21 to 27 of the spectrum 20 and are at the same spacing as the lines are the dispersed in the spectrum. For a typical grating having 12 grooves per millimeter this dispersion is about 3.5 microns per millimeter. Similarly, the second set of slits 51,53,54,56 and 57 correspond in spacing to the reference bands 31,33,34,36 and 37. The two sets of slits (line slits 41 to 47, and reference band slits 51,53,54,56 and 57) are offset from each other in the direction in which the chopping mask 9 vibrates. That direction is indicated by the arrow 9' and is such that at one time only line slits 41 to 47 are moved to the image of the spectrum 20, and pass light flux only from spectral lines 21 to 27; and at another time band slits 51,53,54,56 and 57 are moved to the spectral image and pass energy only from the reference bands 31,33,34,36 and 37. Since both sets of slits may pass flux at the same time as well as different times they may be said to transmit and obscure energy from the lines and bands concomitantly. For the 3.5 micron per centimeter dispersion previously given as an example the spectrometer entrance slit and each of the line and band slits are about 0.1 mm. wide and 10 mm. high, yielding a spectral resolution of about 0.5 microns.

Figure 7:
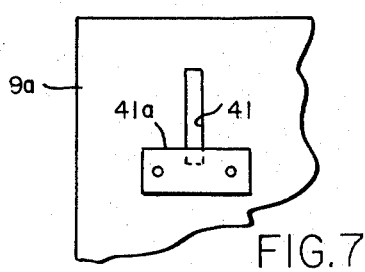
FIG. 7 is an enlarged detail of an alternative chopping mask detail.

Either the width or height of the slits may be varied, as shown in FIG. 7, by means of a slide 41a adjustably mounted on a chopper mask 9a which is otherwise like the mask 9 of FIG. 3. Since the chopping mask 9 is usually preformed for specific uses such as exhaust gas analysis, the width or height of the slits may be varied in fabrication according to the characteristic of the spectral line or band to be transmitted by the slit. For example, in FIG. 3, one slit 45 intended to transmit the widely dispersed but weakly absorptive lines 25 or nitric oxide (NO) is made wider than the other slits.

Figure 6:
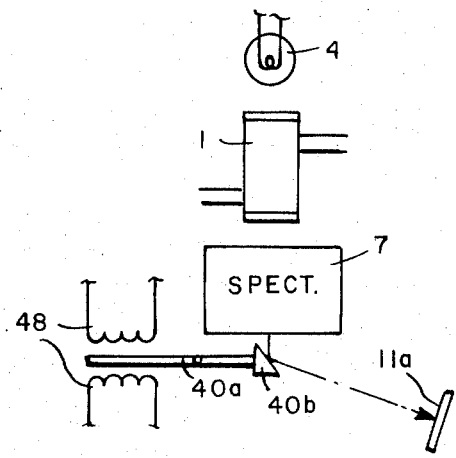
FIG. 6 is a diagram of an alternative spectrum chopping apparatus.

Instead of vibrating the chopping mask 9 with respect to a fixed spectral image as shown in FIG. 1, the image may be moved with respect to the mask as shown in FIG. 6. Therein a plane reflector 40b is mounted on a pivoted arm 40a oscillated by coil 48. The reflector 40b causes an image of the spectrum exiting from the spectrometer 7 to oscillate on a fixed chopping mask 11a with the same relative motion and chopping or flux modulating function as described with respect to FIG. 1.

In operation the chopping mask 9 of FIG. 3 transmits flux from the selected lines and bands in seven channels I to VII. The first channel I includes the alternately chopped flux from the hexane line 21 and reference band 31 through slits 41 and 51. In the second channel II the sulphur dioxide line 22 is transmitted by slit 42 and the same reference band 31 as for channel I is transmitted by slit 51. Transmission in the remaining channels is set forth in Table One below.

TABLE ONE

| Channel | Compound | Line | Slit | Band | Slit |
|---------|----------|------|------|------|------|
| I | $C_6H_{14}$ | 21 | 41 | 31 | 51 |
| II | $SO_2$ | 22 | 42 | 31 | 51 |
| III | $CO_2$ | 23 | 43 | 33 | 53 |
| IV | CO | 24 | 44 | 34 | 54 |
| V | NO | 25 | 45 | 34 | 54 |
| VI | $CH_2O$ | 26 | 46 | 36 | 56 |
| VII | $NO_2$ | 27 | 47 | 37 | 57 |

The alternately transmitted line and reference band flux in the seven channels I to VII are further selectively transmitted by the stepwise moving encoding mask 11 of FIG. 4. As fully shown and described in applicants' copending application Ser. No. 834,392, filed June 18, 1969, and now U.S. Pat. No. 3,578,980, such an encoding mask comprises an elongate strip with light transmitting windows or like elements distributed in a plurality of arrays, one array comprising windows 61,64,66 and 67 and a second array comprising windows 62,65 and 68. Each window transmits energy in one or more of the channels I to VII, the maximum number of windows in this example being seven. A total of approximately seven arrays are formed crosswise of the encoding mask 11 (as compared with the lengthwise arrays of the above-mentioned application). Windows are distributed in the arrays in different combinations represented by a set of linearly independent equations of a binary transform which can be represented by a suitable matrix, for example, a Hadamard matrix. The windows are high enough, e.g., about 20 mm., to pass energy from both the line and band slits of the chopping mask of FIG. 3 and vary in width from about 0.43 mm. for the narrowest channel II to about 2.3 mm. for a combination of the two widest adjacent channels IV and V.

The encoding mask 11 is stepped in the direction of the arrow 11' by a stepping motor 71 acting through a helical gear 72 and a non-rotating micrometer screw 73 connected to the mask. Each step advances a successive array of windows in line with one or more of the channels I to IV transmitting a corresponding combination of flux intensities in the channels to the focusing optics 12 and thence onto the photodetector 13. The photodetector thus receives stepwise a series of chopped line and band flux intensities from different selected portions of the spectrum and generates a group of electrical values each proportional to the total flux transmitted through each array. As is described in the aforementioned application the electrical values are registered and then operated on by a computer programmed with the inverse of the matrix defined by the encoding mask arrays, and from the electrical values the flux from each of the selected spectral lines is obtained.

The single photodetector 13 is an infrared sensor such as a room temperature indium antimonide call or a thermoelectrically cooled lead selenide cell operating efficiently at the 5.2 micron wavelength where nitric oxide absorption is strongest. The cell 13 is temperature stabilized or cooled by a controller 74, and is AC coupled to a preamplifier 75. Primarily because the cell and the preamplifier 75 have a low DC response the electrical output of the preamplifier is essentially only the AC difference between the absorption line and reference band flux. Any residual DC component is further suppressed by AC coupling between the cell and preamplifier and by a synchronous demodulator 76 which receives the amplified difference signal from the preamplifier and a synchronizing signal from the chopper mask vibrator power supply 49.

The demodulated difference signals are applied through a final amplifier 77 to a decoder-calibrator 78, which also receives timing signals from a clock 79 or like sequence signal generator which, in turn signals each encoding mask step to the step motor 71. The decoder-calibrator 78 comprises a prewired matrix which is the inverse of the encoding mask matrix. Under an appropriate program accepting encoding mask position information from the clock 79 the inverse matrix logic system decodes the group of electrical values generated by the single photodetector 13, and produces electrically at its several outputs the flux intensity values of the respective selected spectral lines as the encoding mask 11 is stepped through its several positions. These values are individually displayed on indicators of which three, 81,82,83, are shown by way of example. The indicators may be meters, recorders or registers. If, as previously described with respect to slit 45 of FIG. 3 or slit 41 of FIG. 7, all slits are not equal in size, the computer will have normalization circuits to compensate for the different sizes of the slits and produce all output flux values in the same proportion as the flux of the spectral lines.

In FIG. 5 is shown fragmentarily a modulator disk 9b which combines both the modulating function of mask 9 and the encoding function of mask 11 of FIGS. 1, 3 and 4. The disk 9b is rotated by a motor 49a at constant speed around its hub 90 in the image plane of a spectrometer, modulating the flux of the spectral image and transmitting the modulated flux to a single photodetector like cell 13 of FIG. 1. In the disk 9b are slits radially spaced at the same intervals as the selected lines and reference bands in the spectrum of FIG. 2. Slits 41b, for example, correspond to the hexane line 21 of the spectrum; slits 51b correspond to reference band 31; slits 53b correspond to reference band 33; and slits 43b correspond to the carbon dioxide line 23. Slits 41b and 51b comprise the same channel I as in FIG. 3, and are angularly disposed at regular intervals such that as the disk 9b rotates, the flux intensities of line 21 and band 31 are modulated concomitantly at the same frequency. Slits 43b and 53b similarly modulate flux from line 23 and band 33 concomitantly, but at a different frequency because the slits are spaced around the disk 9b at different angular intervals from slits 41b and 51b. The different spacings and modulation frequencies are selected so that the frequencies do not interact after detection by photocell. The frequency modulated signals are analyzed by a circuit essentially the same as that of FIG. 1 except that the chopping mask 9, encoding mask 11 and their respective drives 49 and 71 are replaced by the synchronous drive 49a. The signals are amplified in preamplifier 75, demodulated synchronously with the drive 49a in stage 76, further amplified in stage 77 and applied to a decoder like 78 of FIG. 1 except that it filters the several signals by frequency to the different indicators 81,82,83, etc. Frequency encoding systems of this general type are described by Grainger, Ring and Stell in the Journal Physique, Vol. 28, Suppl. 304, pages C2-44 (1967). The The present system differs by the use of selected line and reference band slits, and has the advantage that the effect of disk wobble is minimized making the width of the slits larger than the usual exit slit width, as is possible when detecting selected lines and reference bands.

The two stage chopping and encoding system of FIG. 1 and the single stage disk of FIG. 5 both increase the stability, reliability and reproducibility of measurement of selected spectral lines by chopping energy from each selected spectral line and a proximate reference band. As a consequence the difference between the line energy and reference band energy may be detected by a single photodetector.

It should be understood that the present disclosure is for the purpose of illustration only and that this invention includes all modifications and equivalents falling within the scope of the appended claims. For example the encoding mask 9 may be moved continuously rather than stepwise by gating the sensing time of the photocell.

I claim:

1. Optical apparatus for measuring the light flux from a plurality of selected lines in a spectrum having at least one band of predetermined spectroscopic characteristic proximate to the selected lines, each line and its proximate band being a set, comprising:

modulator means for repeatedly transmitting and obscuring the flux from said selected lines and proximate band concomitantly including portions disposed to transmit flux from at least two lines of different sets simultaneously and a separate portion for transmitting flux from a band at another time, and further including encoding means selectively transmitting flux from both the line and band of each set, photoelectric means for sensing the modulated flux, and means for projecting the modulated flux from said line and band on said photoelectric means, thereby to cause said means to produce electrical values representing the flux of the selected lines.

2. Apparatus according to claim 1 wherein said modulator means comprises light transmitting elements spaced in a relation corresponding to the distribution of said lines and band in said spectrum.

3. Apparatus according to claim 2 wherein said elements have different flux transmitting capacities.

4. Apparatus according to claim 3 wherein at least one of said capacities are adjustable.

5. Apparatus according to claim 2 wherein said elements correspond to selected lines of the spectrum.

6. Apparatus according to claim 5 wherein said selected lines are characteristic of predetermined chemical compounds.

7. Apparatus according to claim 6 wherein the predetermined compounds are gases.

8. Apparatus according to claim 7 wherein the gases are those present in combustion products.

9. Apparatus according to claim 1 wherein said modulator means is disposed in the image plane of said spectrum.

10. Apparatus according to claim 1 in combination with spectral dispersion means producing a spectrum in a plane, said modulator means being disposed at said plane and forming an exit aperture for the spectral dispersion means.

11. Apparatus according to claim 1 wherein said modulator means comprises a mask movable transversely of the spectrum and having slits at the image of said line and of said band respectively, the line and band slits being offset in the direction of motion of the mask.

12. Apparatus according to claim 1 wherein said modulator means comprises a stationary mask and a movable reflector for moving the spectrum transversely of the mask, said mask having slits at the image of said line and of said band respectively, the line and band slits being offset in the direction of movement of the spectrum.

13. Apparatus according to claim 1 wherein said modulator means comprises a rotating disk having a set of slits for each said line and band, the slits being rotatable with the disk through the image of the line and band respectively, the slits of both sets having the same angular spacing around the disk, and the slits of one set being angularly offset from the slits of the 14. Apparatus according to claim 1 wherein said photoelectric means comprises a single photoelectric device.

15. Apparatus according to claim 14 wherein said photoelectric means has a response characteristic detecting substantially only the difference between the flux from a line and from its proximate band.

16. Apparatus according to claim 15 wherein said photodetector has low direct current response.

17. Apparatus according to claim 1 wherein the light transmitting element for said one band is proximate to the light transmitting element for both said two lines.

18. Apparatus according to claim 1 wherein said encoding means comprises a plurality of arrays of flux transmitting elements and means for moving the encoding means to bring successive arrays of elements into flux transmitting relation with said lines and bands.

19. Apparatus according to claim 1 wherein said modulator means comprises a first light modulator having spaced elements for transmitting flux from respective lines and bands, and means producing relative movement between said modulator and said lines and bands, and an encoding modulator having a plurality of arrays of elements dimensioned to transmit flux from both the line and band of each set, and means for producing relative movement between the encoding modulator and said lines and bands to bring successive arrays of elements into flux transmitting relation with different combinations of sets of said lines and bands.

20. Apparatus according to claim 1 wherein said modulating means comprises a moving mask having a plurality of sets of flux transmitting elements, one set for each line and each proximate band, the elements of each line set and its proximate band set being spaced at the same intervals in the direction of movement to modulate flux from each line and its proximate band at the same frequency.

21. Apparatus according to claim 20 wherein the elements for different lines are differently spaced to modulate flux from different lines at different frequencies.

22. Apparatus according to claim 20 wherein the elements for each line and its proximate band are displaced in said direction of movement so as to transmit flux from the line and band during different time intervals.

23. Apparatus according to claim 1 wherein said photoelectric means comprises a single photoelectric device receiving transmitted and encoded flux from said plurality of lines and band simultaneously.

24. Apparatus according to claim 23 wherein said photoelectric means comprises a detector of the difference between the flux of the lines and proximate bands.

25. The method of measuring the light flux of a plurality of selected lines of a dispersed spectrum which comprises masking the spectrum except for the selected lines and at least one wavelength band proximate to said lines, each line and its proximate band constituting a set, periodically masking and transmitting flux from said lines and band, the flux from said lines being transmitted at different times than the flux from each band, optically encoding the periodically transmitted flux from the lines and bands in sets each including a line and a band, and photoelectrically detecting the periodically transmitted and encoded flux, to produce an electrical signal representative of the flux of the selected lines.

* * * * *